Sept. 6, 1960    M. C. WELLMAN    2,951,656
FILM CASSETTE ASSEMBLY
Filed March 25, 1957
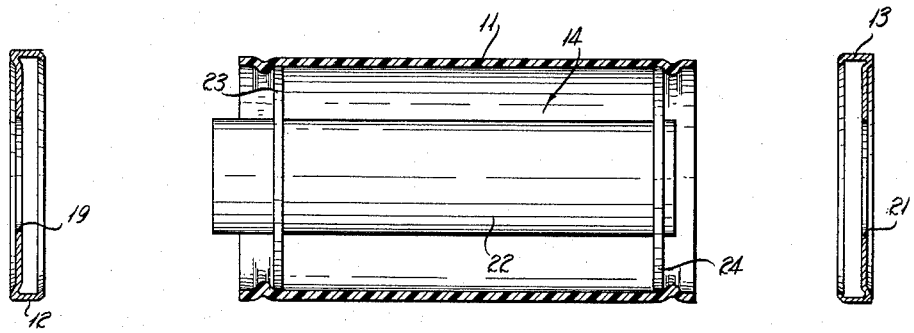
Fig-1.
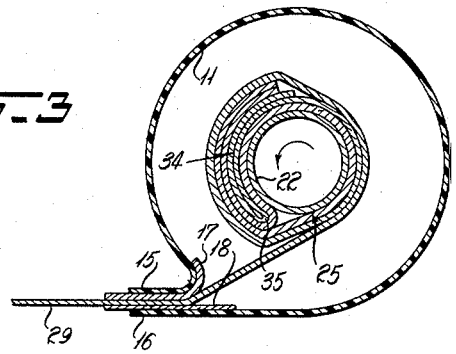
Fig-3
Fig-2
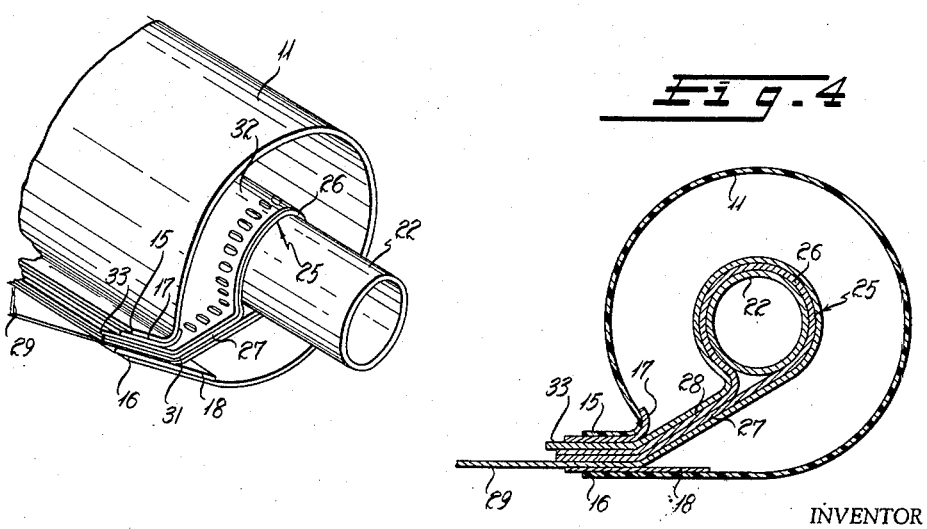
Fig.4
INVENTOR
MAYNARD C. WELLMAN
BY
Strauch, Nolan & Neale
ATTORNEYS United States Patent Office 2,951,656
Patented Sept. 6, 1960

2,951,656

FILM CASSETTE ASSEMBLY

Maynard C. Wellman, Ann Arbor, Mich., assignor to Sylvania Electric Products Inc., New York, N.Y., a corporation of Massachusetts Filed Mar. 25, 1957, Ser. No. 648,075

5 Claims. (Cl. 242—71.1)

This invention relates to a photographic film cassette wherein the end of the film strip is attached in a novel manner and by means of a special adhesive tape arrangement for reliable unwinding from and rewinding on the rotatable spool within the cassette and to prevent accidental separation of the film strip and spool when the cassette is in the camera.

The usual cassette for 35 mm. color film comprises a light tight casing housing a rotatable smooth surfaced spool or spindle on which the film strip is wound with one end attached to the spool. The other end of the film in a loaded cassette projects through a light-baffled side slot in the casing so that when the cassette is placed in the camera the projected leading end of the film strip may be attached by the operator to the usual camera winding spindle, which latter is rotated to draw film out of the cassette and position it before the camera exposure aperture. After the available film areas are exposed the strip is rewound into the light tight cassette and sent to the processor. It is essential that the trailing end of the film strip be absolutely reliably securely attached to the spool so that it will not separate therefrom under the longitudinal pull exerted by the winding spindle, particularly after the last exposure at which time the operator may exert a considerable torque on the wind spindle and an increased longitudinal pull on the film strip before he realizes that the film is exhausted and it is time to rewind into the cassette. Should the trailing end of the film become detached at this point, it must be reattached to the spool under dark room conditions, and an inexperienced operator can easily expose the whole film and ruin the exposures on it.

Considerable difficulty has been encountered in adequately securing the trailing film end to the spool without resorting to expensive and complex structures. It has been proposed to provide barbs and adhesive directly on the smooth surfaced spool, but these have not proved reliable, and more recently it has been suggested to attach the trailing end of the film strip to the spool by an intermediate adhesive tape such as disclosed in United States Letters Patent No. 2,571,796 to Ulmschneider et al., dated October 16, 1951. The present invention is an improvement over this latter type, and involves the special coaction of a pressure sensitive tape and the film end to be hereinafter described and claimed, which has been found to be superior to any heretofore proposed.

It is therefore the major object of this invention to provide a novel manner of non-slip attachment of a photographic film strip for winding, unwinding and rewinding on a cassette spool.

A further object of the invention is to provide a novel overlying association of flexible pressure sensitive tape and photographic film strip end for reliably attaching the strip upon a rotatable spool within a cassette.

It is a further object of the invention to provide a novel manner of attaching the trailing end of a photographic film strip upon a rotatable smooth surfaced spool within a cassette wherein a flexible double surface coated pressure sensitive tape is wrapped around the spool with its opposite ends secured together in full surface bond and the trailing end portion of the film strip overlies the outer surface of the wrapped tape, so that the inner surface of the looped portion of the tape is bonded tightly to the spool surface and the entire outer surface of the tape is surface bonded to the film strip.

Further objects of the invention will appear as the description proceeds in connection with the appended claims and annexed drawing wherein:

Figure 1 is an exploded view of a cassette assembly of the type to which the invention is applied;

Figure 2 is a substantially perspective view of an open-ended cassette with a spool flange omitted showing the initial adhesive tape and film end connection prior to winding the unexposed film into the cassette;

Figure 3 is a cross-section showing the relation of parts during winding of the film within the cassette; and Figure 4 is a cross-section that shows the relation of parts at the end of the film unwinding operation.

The cassette assembly consists essentially of a tubular casing 11 having a longitudinally split side wall, removable end caps 12 and 13 and a rotatable spool 14 journalled at opposite ends in the end caps. The slotted casing side wall is formed with angular flanges 15 and 16 that are parallel at least at their outer ends to define a narrow mouth for passage of the film, and this mouth is made light tight by means of internal baffle strips 17 and 18 secured along the adjacent casing wall and within the mouth. These baffle strips are preferably of felt or plush which will not scratch the film and the mouth is long and narrow enough to be light tight.

The end caps 12 and 13 are formed with central circular openings 19 and 21 respectively which are bearing supports for the opposite ends of the cylindrical smooth surfaced spindle 22 of spool 14. Flanges 23 and 24 are provided on spindle 22 to complete the spool, and the film is to be wound on the spindle between these flanges.

The parts are preferably all of stamped sheet metal, and the interiors such as the entire spool 14 are lacquered black to reduce any internal reflection. In any event the section of spindle 22 between the flanges is smooth, hard surfaced and relatively slippery and the problem of the invention was to simply and reliably attach thereto the trailing end of a usual film strip, which is a strip of emulsion coated cellulose acetate that is stiff but highly flexible, smooth-surfaced, slippery and difficult to manage.

Referring to Figure 2 where the spool end flange is omitted for the sake of clear disclosure, a length of flexible adhesive tape 25, which here is a so-called double coated tape in that it carries a layer of sticky pressure sensitive adhesive on both surfaces, is essentially doubled over the spindle 22 between the spool flanges. The tape 25 thus has its central portion 26 looped snugly about and adhesively bonded upon most of the spindle circumference and its end sections 27 and 28 overlie each other in full surface bond to extend away from the spindle.

The film strip 29 has a first end section 31 full surface bonded to the tape section 27, a second end section 32 looped in full surface bond with the tape section 26 around the spindle, and a third or terminal end section 33 in full surface bond with the tape section 28. As illustrated in Figures 2 and 3, the length and width of film strip which overlies the outer adhesive surface of tape 25 are sufficient to cover that adhesive surface so that there is no danger of the sticky adhesive contacting the baffle strips, the rest of the film strip on the casing. The film is usually the conventional 35 mm. Kodachrome type, and the tape 25 is of the same or slightly less width.

The tape and film are bonded together and upon the spindle 20 when the spool is outside casing 11, and then the parts are assembled in conventional manner. Figure 3 shows how the film winds on the spool either initially or during rewinding after exposure. It will be seen that the composite length of tape and film indicated at 34 in Figure 3 is doubled back with a resultant sharp reverse crease or fold 35 in the film strip when the spindle is wound in the direction of the arrow and snubbed upon the spool by the pull of the film strip 29 which slidably passes through the light tight casing mouth during winding. This snubbing action coupled with the tight adhesive bond of the tape on the spindle insures that there is no slip or relative rotation between the spindle and the composite tape and film loop, and as the layers of film accumulate the radial pressure increases the holding action of the tape with both the spool and the film strip.

During unwinding, as shown best in Figure 4 when the last exposure has been made and the film fully drawn out of the cassette it will be seen that an increase in pull in the direction of the arrow will result in effectively a straight radial pull with respect to spindle 22 and there will be no tendency to slip the tape with respect to the smooth spindle surface. As illustrated the overlapped lengths of tape and film are preferably long enough to project through the cassette wall in the unwound position. It has been discovered that this eliminates the tendency of the pull on the film to rotate the spool but instead tightens the bond between the tape and the film.

Pressure sensitive adhesive is a tacky adhesive which adheres upon the application of pressure to the carrying tape or vehicle, and the most common form is that known as Scotch tape.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a film cassette, a tubular light tight casing having a side slot serving as a film passage mouth, a spindle rotatably mounted within said casing and having a smooth substantially cylindrical surface, a length of flexible tape adhesive coated on both sides having its intermediate section looped over and surface bonded to said spindle and its end sections overlapped in full surface bond with each other, and a film strip of flexible, stiff relatively slippery smooth surfaced material having its end portion looped around the spindle and extending in overlapped full surface bond over the entire surface of said tape opposite that side of the tape which is bonded to the spindle.

2. In the film cassette defined in claim 1, said overlapped lengths of film and tape being sufficiently long that the composite tape-film assembly extends through the mouth of said casing when the effective film is fully unwound from the cassette.

3. In a film cassette, a light tight casing, a spindle rotatably mounted within said casing, and means for anchoring the end of a film strip on said spindle comprising a length of double surface coated adhesive tape looped over said spindle with its free ends overlapped, and a film strip having its trailing end overlapping substantially the entire surface of said tape opposite that side of the tape which contacts the spindle.

4. In a film cassette, a light tight casing, a spindle rotatably mounted within said casing, and means for anchoring the trailing end of a film strip on said spindle comprising an adhesive lined end section of said film strip looped over said spindle in substantially full surface adhesive bond therewith and with the terminal section of the film strip directly adhesively bonded in flat overlapping relation with the section of said film strip at the other side of the looped section.

5. In a film cassette, a tubular light tight container, a spindle rotatably mounted in said container, and means for anchoring the trailing end of a film strip on said spindle comprising a length of tape looped over said spindle and doubled back on itself so that its ends are overlapped, a film strip having its end portion tightly wrapped around said spindle in completely overlying relation to said tape, and layers of adhesive disposed directly between the overlapped ends of said tape, the tape loop and the spindle and the coextensive surface areas of the tape and film strip.

References Cited in the file of this patent

UNITED STATES PATENTS

| | | |
|---|---|---|
| 2,537,588 | Husson | Jan. 9, 1951 |
| 2,571,796 | Ulmschneider et al. | Oct. 16, 1951 |